W. B. MUMBRUE.
Fruit-Drier.

No. 223,059. Patented Dec. 30, 1879.

Witnesses:
P. C. Kenyon,
Frank W. Heers.

Inventor:
William B. Mumbrue,
By Thomas G. Orwig, Atty.

UNITED STATES PATENT OFFICE.

WILLIAM B. MUMBRUE, OF MONTOUR, IOWA.

IMPROVEMENT IN FRUIT-DRIERS.

Specification forming part of Letters Patent No. 223,059, dated December 30, 1879; application filed October 29, 1879.

*To all whom it may concern:*

Be it known that I, WILLIAM B. MUMBRUE, of Montour, in the county of Tama and State of Iowa, have invented an Improved Fruit-Drying Apparatus, of which the following is a specification.

The object of my invention is to provide a simple, cheap, and efficient drying apparatus that is specially adapted for family use, and by means of which time, labor, and fuel can be saved in drying fruit or any substance that can be placed upon the fruit-trays that form a component part of my complete apparatus.

Heretofore furnaces and interchangeable drawers or trays have been combined with a portable case in such a manner as to cause the heat radiated from the furnace to pass sinuously over the contents of the drawers, while much heat and carbonaceous products of combustion, that are valuable for curing vegetable and animal matter, were carried off through a flue and wasted. Dehydrators have also been interposed between the fire-chamber or furnace and the drying-chamber of a complicated drying apparatus, that required the operation of an endless carrier or fan to accomplish the results contemplated. By my improvement I utilize all the valuable products of combustion and require no carrier to keep in motion the substance to be dried and no fan or artificial blast to purify the heated air.

My invention consists in forming, arranging, and combining a portable case or building, a furnace-chamber, a furnace, a purifying-chamber, a drying-chamber, and a series of interchangeable drawers, as hereinafter fully set forth.

Figure 1:
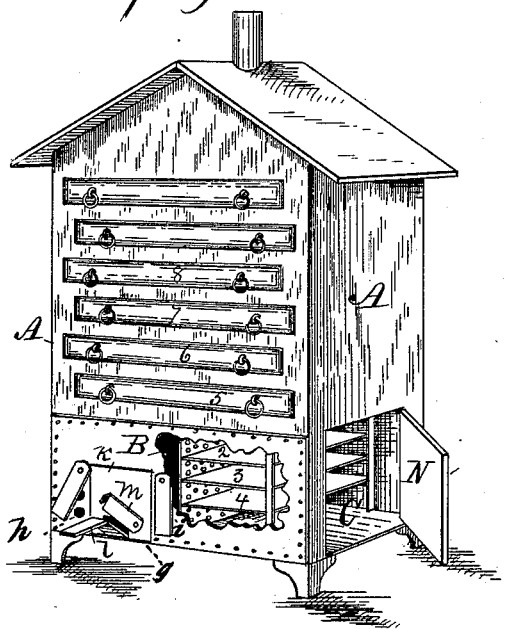
Figure 2:
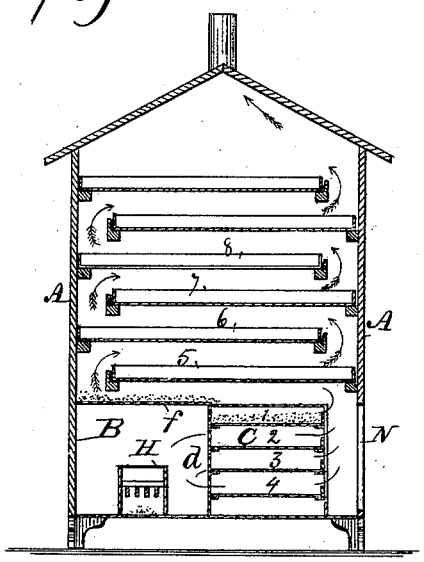
Figure 3:
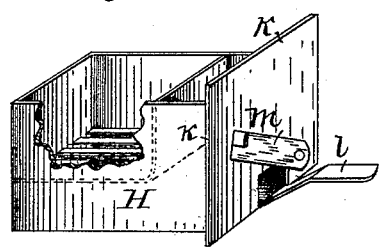

Figure 1 of my drawings is a perspective view of my apparatus, in which sections of wall are broken away to show the interior. Fig. 2 is a vertical section. Fig. 3 is a perspective view of the removable furnace. Together they clearly illustrate the construction and operation of my complete invention.

A A represent the side walls of a wooden portable case or a fixed building that is tightly closed on its rear side and has openings on its front side and upper portion for the reception of movable drawers. It may vary in size, as desired. It has a fire-proof floor and a sheet-metal wall at the lower portion of its front side and a draft flue or chimney extending upward from its closed top or roof.

B is a furnace-chamber, and C is a purifying-chamber, formed and combined in the bottom of the case by means of a perforated partition-wall, $d$, that is preferably made of sheet metal. $f$ is the metal top of the furnace-chamber, connected with the side, front, and rear wall of the case and the perforated partition-wall $d$ in such a manner that it will be an air-tight cover for the fire-chamber and a platform or shelf that can be readily covered with wood-ashes or other non-conductor of heat, to prevent the radiation of heat. $g$ is an opening in the front side of the furnace-chamber, through which my removable furnace is introduced. $h$ $i$ represent induction-ports or registers at the sides of the opening $g$, through which cold air is admitted to become heated and to form a current upward through the apparatus. The wooden walls of the furnace-chamber may be lined with sheet metal or protected from heat in any suitable way.

H represents my movable furnace, specially adapted to be placed in the furnace-chamber B through the opening $g$. It is open at the top, and has an enlarged front or flanges, $k$, at its sides and top that overlap the edges of the opening $g$, to completely close the said opening. It also has a handle, $l$, extending horizontally from the bottom plate, and an opening with a damper, $m$, through which oxygen is admitted to feed the furnace-fire.

N represents a door in the wall of the case, through which access is gained to the purifying-chamber C. 1 2 3 4 represent a series of basins, trays, or shelves that extend horizontally from the perforated partition $d$ to form a large area upon which water, lime, or any other suitable liquid or solid may be placed to absorb carbonic acid or other impurities that may pass from the furnace and furnace-chamber through the perforated partition $d$ in the current of heated air that is required to ascend through the chamber C to the drying-compartment immediately above the two chambers B and C.

5 6 7 8 represent a series of drawers that are uniform in size and shape, and designed to fit into corresponding recesses formed in the upper portion of the case in such a manner that they will serve as deflectors to direct the current of hot air from the purifying-chamber C upward in a sinuous way around each drawer and its contents, and from one to the other, as indicated by arrows in Fig. 2, to the roof and draft-chimney. These drawers can readily be withdrawn and filled with fruit or other substances that are to be dried and cured, and then replaced to close the drying-chamber and to subject their contents to a continuous current of heated and purified air until all the volatile parts are extracted by evaporation and carried off in a gaseous form through the chimney.

Coke, charcoal, or other suitable fuel may be used in the furnace to generate the heat required to produce the current of hot air.

I claim—

1. In a drying apparatus, the combination of the furnace H, the furnace-chamber B, having a perforated side wall, $d$, and the purifying-chamber C, having a series of stationary basins, trays, or shelves, 1 2 3 4, substantially as shown and described, for the purposes specified.

2. The movable open-top furnace H, having flanges $k$ and a handle, $l$, in combination with the furnace-chamber B, having an opening, $g$, a closed top, $f$, and a perforated side, $d$, substantially as shown and described, for the purposes specified.

3. In a portable case or building, the furnace-chamber B, the purifying-chamber C, having a series of basins, trays, or shelves, 1 2 3 4, and a drying-compartment having a series of removable drawers, 5 6 7 8, constructed and arranged, relative to each other, substantially as shown and described, for the purposes specified.

4. The drying apparatus composed of a portable case or building having a series of removable drawers in its top portion, a furnace-chamber, B, and a purifying-chamber, C, in its bottom, and a chimney in its top, and a removable furnace, substantially as shown and described, to be operated in the manner and for the purposes set forth.

WILLIAM B. MUMBRUE.

Witnesses:
   H. J. STEVENS,
   L. BINGHAM.